Dec. 3, 1963 W. DIETRICH 3,113,297

BINARY INFORMATION TRANSFER DEVICE

Filed March 17, 1961

4 Sheets-Sheet 1

INVENTOR
WOLFGANG DIETRICH

BY [signature]

ATTORNEY

United States Patent Office 3,113,297

Patented Dec. 3, 1963

3,113,297

BINARY INFORMATION TRANSFER DEVICE

Wolfgang Dietrich, Adliswil, Zurich, Switzerland, assignor to International Business Machines Corporation, New York, N.Y., a corporation of New York Filed Mar. 17, 1961, Ser. No. 96,541

Claims priority, application Switzerland June 24, 1960

7 Claims. (Cl. 340—174)

This invention relates to a device for the transfer of binary information from a controlling to a controlled thin magnetic film element and is employed preferably in electronic computers and information processing systems.

Thin magnetic film elements or switching elements of thin magnetic layers are already known; their application in computers and information processing systems has already been proposed. A thin magnetic film is a layer of magnetic material, having a thickness of, for example, 100 to 10,000 A. (1 A.$=10^{-8}$ cm.), deposited on a substrate. Special interest is focused on thin magnetic film elements having uniformly aligned magnetization; whereby a distinction is made between isotropic and anisotropic magnetic layers. In the case of isotropic magnetic layers the magnetization remains for a given case in the position in which a switching-over process (brought about, for example, by the application of an external magnetic field), places it. In the case of anisotropic magnetic layers there are certain preferred directions for the magnetization. With thin magnetic layers having uniaxial magnetic anisotropy the magnetization assumes a position which is parallel or antiparallel to a definite preferred direction, which is also termed the "easy direction." If, with a thin magnetic layer having uniaxial anisotropy, the magnetization is deflected from the easy direction by the application of an external magnetic field, it will return to the next neighboring preferred direction when the external magnetic field is disconnected.

It is also realized that it is possible to represent the binary information ONE and ZERO by the parallel or antiparallel alignment of the magnetization with respect to the easy direction and to achieve a switch-over of a thin magnetic film element from the ONE to the ZERO position and vice versa. This switch-over can be achieved by domain-wall or rotational switching. The magnetization reversal achieved with rotational switching is preferred because of the much shorter switching times being in the order of magnitude of nanoseconds (1 ns.$=10^{-9}$ s.). With rotational switching, magnetization reversal is achieved by a generally coherent rotation of the magnetization into the new direction.

The rotational switching of thin magnetic layers for the transfer of binary information from one first element (controlling element) to a second element (controlled element) is also known. The process involves deflecting, by applying an external driving field to the controlled element, the magnetization of said element into a direction at least approximately perpendicular to the easy direction, which is also referred to as the "hard direction," and allowing it, by disconnecting the external driving field, to switch back into a preferred direction determined by a control impulse which emanates from the controlling element and is transmitted via a coupling line. This control impulse is maintained in that by applying an external magnetic field to the controlling element the magnetization of said element is deflected out of its easy direction in which, by its parallel or antiparallel disposition it represents the stored binary information, towards the hard direction. Depending on the initial position, a positive or negative electrical impulse is induced in the coupling line of the two elements. This current impulse generates a pulse-like magnetic field having a controlling effect on the second element, and this influences the direction in which the magnetization, which is deflected in the hard direction, is switched back. The magnetization of the controlled element switches back to one of the two preferred directions, i.e. in relationship to the polarity of the control pulse, with simultaneous disconnection of the external field influencing the controlled element, and thus takes over the binary information previously stored in the first element.

In the known data transmission system it is necessary to have a synchronous mode of operation of the connection and disconnection of the above referred to external fields; moreover, coupling means are required between the individual elements.

Accordingly, it is a prime object of the present invention to provide an arrangement, having a mode of operation independent of synchronism, for transmitting binary information from a first binary storage or switching element to a second, essentially similar storage or switching element.

A further object of this invention is to provide a shift register in which the binary information ONE and ZERO may be transmitted over several stages at high speed.

Another object of this invention is to provide an information transmission system in which the external magnetic fields can be generated by simple driver means and by simple electrical waveforms (pulse trains or sinusoidal oscillations).

Still another object of this invention is to provide devices which are technologically simple and cheap to manufacture, preferably by means of evaporation processes.

The above objects are accomplished by construction of a device for the transfer of binary information from a controlling thin magnetic film element to a controlled thin magnetic film element in accordance with this invention. The latter magnetic film element has a magnetization which is capable of assuming two different stable conditions, and means are provided for transferring the magnetization of the controlled element temporarily out of the stable state conditions into a state in which it can be easily influenced with respect to its transition to the two stable conditions, with construction of the device being such that the two thin magnetic film elements are arranged in space so that the controlled element is located in the sphere of influence of the magnetic stray field of the controlling element.

The foregoing and other objects, features and advantages of the invention will be apparent from the following more particular description of preferred embodiments of the invention, as illustrated in the accompanying drawings.

In the drawings:

FIGS. 1*a*–1*c* are diagrammatic representations of the transmission of binary information, applying the principle of stray field coupling.

FIGS. 2*a* and 2*b* are sectional views of one embodiment of a shift register.

FIGS. 5*a*–5*f* are diagrammatic sketches illustrating the shift register operation and showing the states of magnetization of the shift register elements at various instants during the process of transmitting information.

Figure 6:
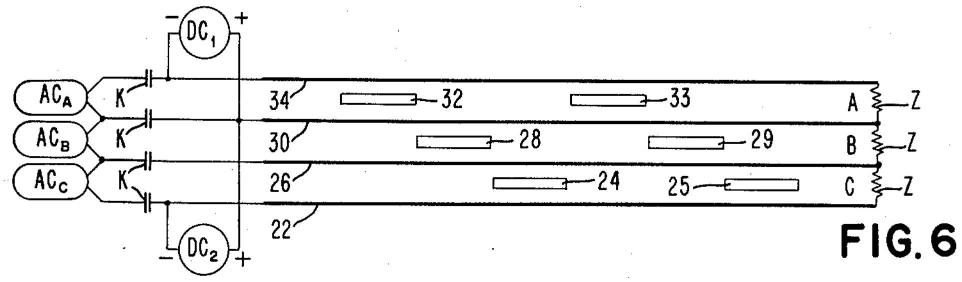

FIG. 6 is a diagrammatic sketch of the shift register showing the connections to D.C. and A.C. supplies for another form of operation.

Figure 7A:
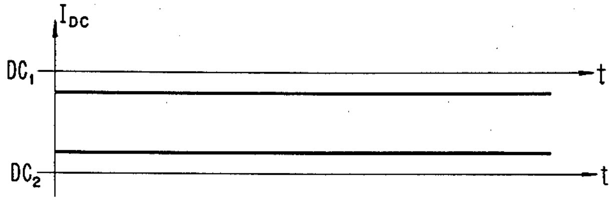
Figure 7B:
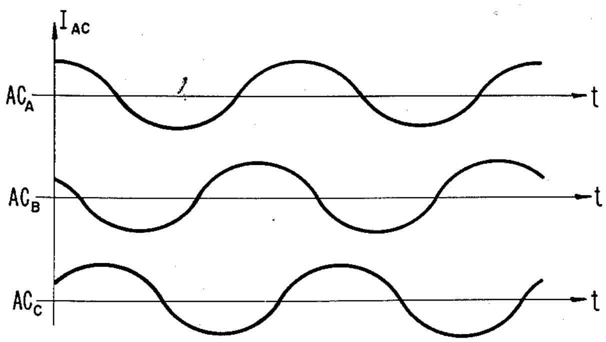
Figure 7C:
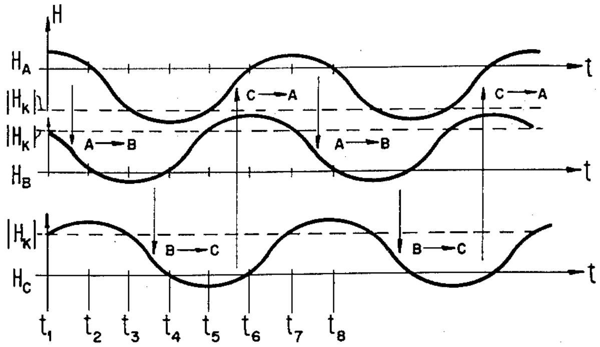

FIGS. 7*a*–7*c* are diagrams of the D.C. and A.C. driver currents and of the resulting magnetic driving fields which by current superposition exert an effective influence on the thin magnetic film elements of the shift register for the form of operation according to FIG. 6.

Figure 1A:
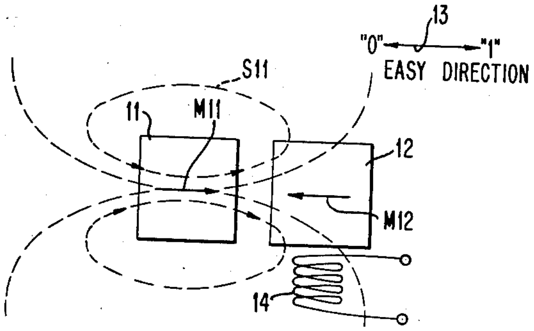
Figure 1B:
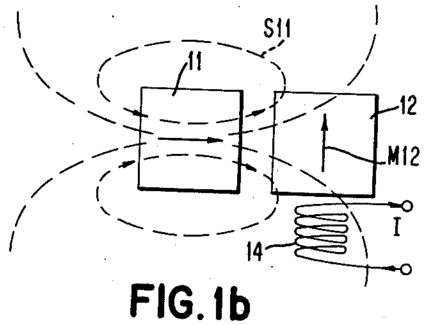
Figure 1C:
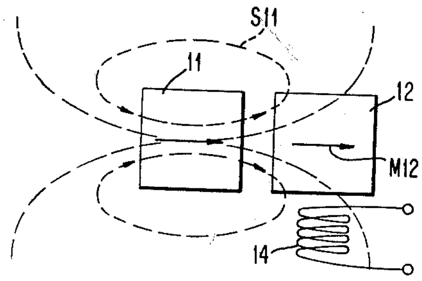

By way of introduction, reference is made to the FIGS. 1*a* to 1*c* in which the transmission of binary information is illustrated diagrammatically at three successive instants, apply magnetic stray-field coupling in accordance with the principle of the invention.

Two magnetic thin film elements 11 and 12 are illustrated in FIG. 1*a*. Each element has uniformly oriented magnetization represented by the appropriate magnetization vectors M11 and M12. At least the element 12, which performs the function of the controlled element, should have a preferred direction for the magnetization (uniaxial magnetic anisotropy); the preferred or easy direction is illustrated by a double arrow 13. A magnetization aligned to the left then represents a binary ZERO "0" and a magnetization aligned to the right, a binary ONE "1."

It is assumed that in accordance with this definition, a "1" is stored in the first (controlling) element 11 and a "0" in the second (controlled) element 12. The requirement now is to transfer to the second element the "1" stored in the first element. In order to achieve this, a coil 14 is provided; when a current flows in the coil 14 it generates an external magnetic field in the controlled element 12, which field is perpendicular to the easy direction, i.e. parallel to the hard direction. At the instant represented in FIG. 1*a*, there is no current flowing through coil 14, so that the magnetization M12 is aligned parallel to the easy direction. The two elements 11 and 12 are situated close together, so that the element 12 is located in the magnetic stray field S11 of the thin magnetic film 11. In FIG. 1*a* only the stray field S11 is illustrated; the stray field of the thin magnetic film 12 is not shown (although it is also present) since it does not play a part in the process considered here.

When a current I is passed through coil 14 in the manner illustrated in FIG. 1*b*, and when this current is so heavy that the magnetic field of coil 14, which is effective with respect to the thin magnetic film element 12, is greater than the anisotropic field strength $H_K$ of the magnetic layer, the magnetization vector M12 is deflected in the hard direction. In this way the magnetization of the controlled element is transferred from a stable state condition to a state in which it can be easily influenced with respect to its transition to a predetermined one of the two stable conditions "0" or "1." When the external magnetic field is eliminated by disconnecting the current I from coil 14, it requires only a comparatively slight controlling influence to determine the direction into which M12 is switched back. The static stray field S11 of the controlling element 11 effects this controlling influence on the return of M12. With respect to element 12, the stray field S11 has a component which is aligned to the right, so that when the current I is disconnected, the magnetization vector switches back aligning to the right, which characterizes a "1," whereby the binary information stored in element 11 is taken over. The final condition is represented in FIG. 1*c*: Element 12 now stores the same information as element 11.

Figure 2A:
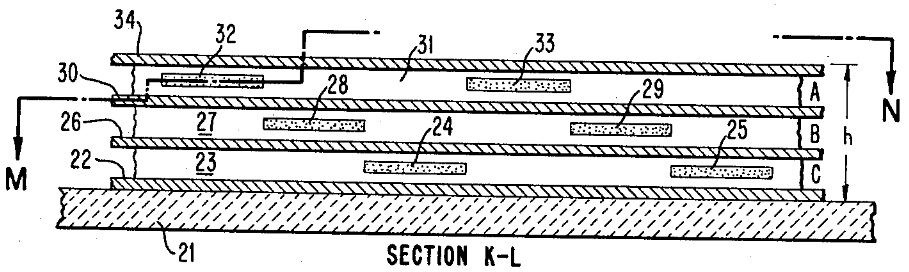
Figure 2B:
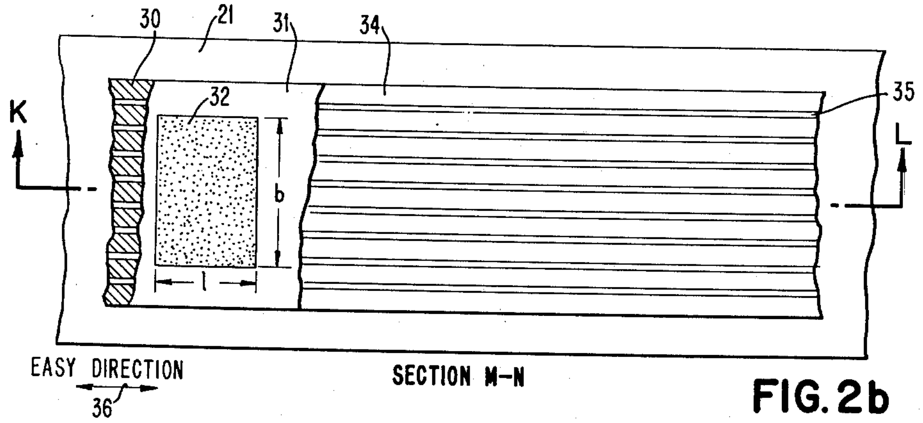

Devices which enable binary information to be transmitted via several stages are referred to as shift registers; they are widely used in computers and data processing systems. One arrangement of shift register based on the principle of magnetic stray-field coupling involved in this invention is illustrated in FIGS. 2*a* and 2*b*. FIG. 2*a* is a section across KL and FIG. 2*b* is a section across MN (plan view) of the shift register. The arrangement shown has been devised so that it can be manufactured preferably by a process of multi-layer vaporization. A substrate is employed as, for example, a glass plate 21, on which a first metallic conductor 22 is vaporized. An insulation layer 23 is applied to the conductor; this can also be applied for vaporization, e.g. a silicon dioxide layer (mixture consisting of SiO and $SiO_2$). Several thin magnetic film elements 24, 25 are applied in the same plane C. These, too, can be produced by vaporization (e.g. of 80% Ni and 20% Fe). The thin magnetic film elements 24, 25 are insulated from a second metallic conductor 26 located above by additional application of the insulating layer 23. Separated from conductor 26 by an insulating layer 27 there are several thin magnetic film elements 28, 29 separated from each other in space and arranged in a plane B. The right-hand edges of these elements 28, 29 are situated approximately above the left hand edges of elements 24, 25, as it is shown in the arrangement of FIG. 2*a*. There is a third conducting layer 30 above, also separated by the insulating layer 27 from the thin magnetic film elements 28, 29. Then, analogously as hitherto, another insulating layer 31 is applied in which, in the plane A, are located several thin magnetic film elements 32, 33, separated from each other in space. Their right-hand edges are located approximately above the left-hand edges of the elements 28, 29, situated in the plane B, while their left-hand edges are situated approximately above the right-hand edges of the thin magnetic film elements 24, 25 located in plane C. A fourth conducting layer 34 is located uppermost in the device.

These conducting layers 22, 26, 30 and 34 are provided advantageously with a large number of quite narrow longitudinal slits 35, in the first instance to facilitate the passage of stray fields leaving the thin magnetic film elements and in the second, to minimize damping effects caused by eddy currents. The slits can be produced for example, by etching and may be about 25$\mu$m. (1$\mu$m.$=10^{-6}$ m.) wide.

Besides employing a multi-layer vaporizing process for manufacturing the shift register arrangement shown in FIGS. 2*a* and 2*b*, it is also possible to employ other manufacturing processes, which are known from the manufacture of printed circuits. The conductors 22, 26, 30 and 34 as well as the thin magnetic film elements 24, 25, 28, 29, 32 and 33 can also be produced by electrolytic deposition from an electrolyte containing the appropriate metal ions, also by chemical precipitation of a solution containing the appropriate metal compounds. The insulating layers 23, 27 and 31 can also consist of sprayed-on synthetic material.

The device illustrated in FIGS. 2*a* and 2*b* is by no means to scale. Owing to the thinness of the vaporized layers, the height of the complete arrangement is unusually compact (represented by *h* in FIG. 2*a*). In order to promote a better understanding, a few dimensions of the arrangement shown by way of an example are given here. The thickness of each of the thin magnetic film elements such as element 24 is between 100 and 3000 A., e.g. about 1000 A., their length *l* and their width *b* are each about 3 mm. The metal layers (e.g. copper layers) such as 22, employed as driver lines, are approximately 10,000 A. (=1$\mu$m.); and preferably, they are made somewhat wider than the thin magnetic film elements, i.e. approximately 5 to 10 mm. The widths of the insulating layers must be decided accordingly; a thickness of about 5,000 to 10,000 A. is visualized for the insulating layers (=½ to 1$\mu$m.). These dimensions yield an overall height for the device of approximately 10$\mu$m., i.e. about 1/100 mm. As far as the stray field coupling between two neighboring elements is concerned (also between the elements 24 and 33), the simplifying assumption may be made that all the thin magnetic film elements are in series and have, so to speak, equal rights. The easy direction shall be the same for all elements and this shall be parallel to the axis of the driver lines, corresponding to a double arrow 36 in FIG. 2*b*.

Figure 3:
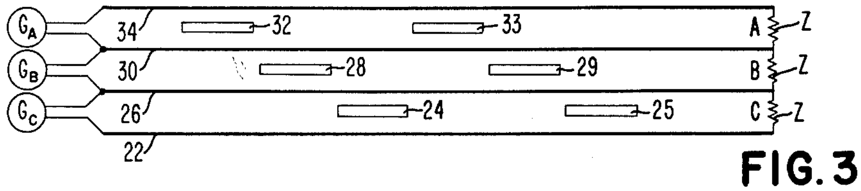
FIG. 3 is a diagrammatic sketch of the shift register of FIGS. 2*a* and 2*b* showing connections to an electrical supply for one form of operation.

For the explanation of the shift register whose structure has just been described, it is proposed to take the simplified representation shown in FIG. 3. The designation of the driver lines, 22, 26, 30 and 34 and the thin magnetic film elements such as element 24 coincides with FIG. 2*a*. The driver lines are connected together at their right-hand ends, taking into consideration the characteristic impedances of the strip conductors formed by the leads 22, 26, 30 and 34; this is taken care of by the indicated terminal impedances Z. The left-hand ends of the driver lines are connected with three impulse generators $G_A$, $G_B$ and $G_C$. As FIG. 3 shows, the driver lines 30, 34 are connected with $G_A$; the lines 26, 30 with $G_B$ and the driver lines 22, 26 with the generator $G_C$. For the sake of simplicity, it is proposed in the following to designate elements 32 and 33 as A elements, 28 and 29 as B elements and 24 and 25 as C elements.

Figure 4:
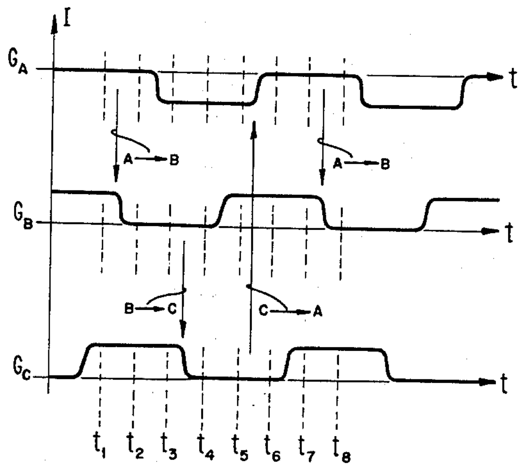
FIG. 4 shows diagrams of the currents in the driver lines of the shift register of FIG. 3.

The generators produce pulse trains in the manner depicted in FIG. 4. The pulse trains have the same pulse frequency, but are phase-displaced 120° with respect to each other. The impulses produced by generators $G_A$ are of opposite polarity by comparison with those of $G_B$ and $G_C$. The currents flowing through the driver lines 22, 26, 30 and 34 generate magnetic fields in the hard direction with respect to the thin magnetic film elements A, B and C. As already mentioned, the strength of the magnetic fields should be greater than or at least approximately the same as the anisotropic field strength $H_K$ of the magnetic layers. In magnetic layers in use today, this is of the order of magnitude of 5 oersted. The current pulses must be selected accordingly.

The generators can be of any kind known in the art for generating current. The switching-in and -out of the currents, effected in a manner which provides pulse trains of the kind represented, can be achieved by electrical or electronic switching means (which, for example, are operated periodically), embodied in the generators.

Making reference to FIG. 5, it is proposed to discuss the sequence with respect to time of the process of shifting information. In the diagrammatic representation selected, all the thin magnetic film elements are projected in one plane (plan view).

Figures 5A, 5B, 5C, 5D, 5E, 5F:
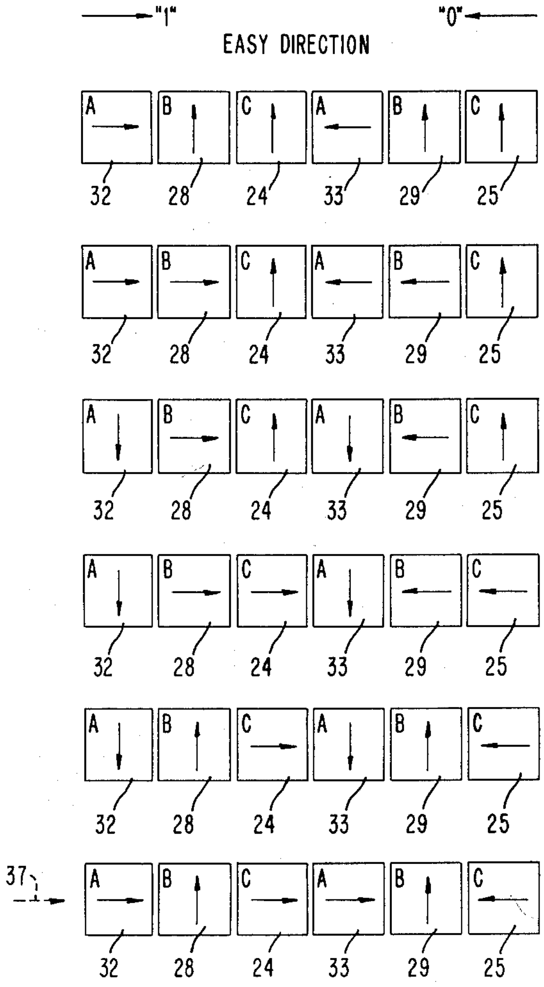

In FIG. 5*a* the device is drawn for an instant $t_1$ (see diagram FIG. 4) during which the generator $G_A$ does not generate any current, and the two generators $G_B$ and $G_C$ generate positive currents having the same amplitude. This means that conductors 26 and 34 are not conducting any current, that the conductor 30 is conducting a current from left to right, and conductor 22 a current from right to left. The magnetic fields generated effect a deflection in the hard direction of the magnetization of the B and C elements, as shown in FIG. 5*a*. The A elements are virtually uninfluenced by a magnetic field, so that the magnetization of these two elements remains in the easy direction. It is assumed that a "1" is stored in the A element 32, and "0" in element 33.

In FIG. 5*b* the device is drawn for an instant $t_2$, during which the generators $G_A$ and $G_B$ do not generate any current, and the generator $G_C$ generates a positive current. In relation to $t_1$ the current from $G_B$ is now disconnected. When this current is switched off the magnetizations of the B elements switch back to the easy direction and simultaneously take over the information stored in the left-hand neighboring A elements. In order to achieve an unambiguous direction of shift of information, the device is arranged so that the right-hand neighboring elements 24 and 25 of the elements 28 and 29 which latter take over the information, are deflected in the hard direction at the instant the information is taken over, so that they do not emit a coupling stray field in the easy direction.

In FIG. 5*c* the device is drawn for an instant $t_3$, during which $G_A$ generates a negative current, $G_B$ does not generate any and $G_C$ generates a positive current. Under these conditions, the B elements remain in the easy direction, while the A and C elements are deflected in the hard direction. Transmission of information did not take place during the transition from $t_2$ to $t_3$; the information stored in the A elements at the instant $t_1$ is now, at the instant $t_3$, in the B elements.

In FIG. 5*d* the device is drawn for an instant $t_4$, during which $G_A$ generates a negative current, and $G_B$ and $G_C$ do not generate any current. In relation to $t_3$, the C elements have switched-back to the easy direction while simultaneously taking over the information from the B elements as a result of the magnetic stray fields emitted from these in the easy direction.

In FIG. 5*e* the device is drawn for an instant $t_5$, during which $G_A$ generates a negative current, $G_B$ generates a positive current and $G_C$ does not generate any current. Under these circumstances the C elements remain in the easy direction, while the elements A and B are deflected in the hard direction. During the transition from $t_4$ to $t_5$, transmission of information did not take place; the information stored in the A elements during the instant $t_1$, and that stored in the B elements during the instant $t_3$ is now, at the instant $t_5$, in the C elements.

Finally, in FIG. 5*f*, the device is drawn for an instant $t_6$, during which $G_B$ generates a positive current while $G_A$ and $G_C$ do not produce any current. In relation to $t_5$, the A elements have returned to the easy direction while simultaneously taking over the information from the neighboring left-hand C elements as a result of the magnetic stray field emitted by the latter. In the drawing it is assumed that a neighboring C element (not drawn) on the left of A element 32 may have stored a "1," i.e. that its magnetic stray field has a component aligned to the right; this is indicated symbolically by an arrow 37. It will be recognized that the elements drawn, namely 32, 28, 24, 33, 29 and 25, represent only part of a long row of elements in a shift register. Similar thin magnetic film elements can also be employed as input and output elements for the shift register.

From what has been said so far, the continuation of the information shifting process will be evident: upon transferring from $t_6$ to $t_7$ (see the diagram FIG. 4) the C elements are deflected in the hard direction, whereby a state analogous to $t_1$ is obtained. The arrows in the diagram of FIG. 4 symbolize that a transmission of information has taken place from the A to the B, from the B to the C and from the C to the A elements, in the manner just described in detail.

For operating the shift register in accordance with the vention involved here it is also possible to employ waveforms different from those illustrated in FIG. 4. Particularly when operating the shift register with very high clock frequencies it will be necessary to select waveforms having the smallest proportion of harmonics, i.e. a sinusoidal oscillation will be selected, or one which approaches such a waveform as closely as possible.

FIG. 6 illustrates the shift register diagrammatically, with the necessary connections to the source of supply. The designation of the driver lines such as line 22 and the thin magnetic film elements such as element 24 coincides again with FIG. 2*a*. The driver lines are joined together at their right-hand ends via the terminal impedances Z. The left-hand ends of the driver lines are connected to two sources of direct current DC1 and DC2 as well as to three sources of alternating current $AC_A$, $AC_B$ and $AC_C$. While the D.C. supply is connected direct, the A.C. supplies are connected via capacitive coupling devices, for instance, capacitors K. The direct current supplied to the shift register is depicted in the diagram 7*a*, and the waveforms generated by the source of alternating currents are illustrated in diagram 7*b*. Diagram 7*c* shows the magnetic fields generated by the superposition of D.C. and A.C. currents which are effective with respect to the A, B and C elements. The indiciated value $H_K$ refers to the anisotropic field strength; as already mentioned, the value of $H_K$ for thin magnetic layers in use today is approximately 5 oersted. The amplitudes of the D.C. and A.C. currents must be adapted to this value.

The currents generated by the D.C. supplies serve solely to build up constant magnetic fields which displace the zero level of the effective external magnetic alternating fields, either upwards (for the A elements) or downwards (for the B and C elements). Since in the case of the B and C elements this displacement of level takes place in the same sense, it is only necessary to have one source of direct current DC2. The waveforms of the A.C. currents can be trapezoidal or approximately sinusoidal, as the diagram FIG. 7*b* shows.

In principle, the mode of operation of the shift register FIG. 6, having waveforms as illustrated in FIG. 7*c*, is similar to that illustrated in FIG. 3, operating with pulse sequences depicted in FIG. 4, which has been described already. Referring to the diagram FIG. 7*c*, which shows the magnetic driver fields $H_A$, $H_B$ and $H_C$ influencing the A, B and C elements, it will be seen that at the instant $t_1$ the magnetization of the B and C elements is deflected towards the hard direction, because at this instant the magnitude of $H_B$ and $H_C$ is equal to or greater than the absolute anisotropic field strength $|H_K|$. Owing to the relatively small magnetic driving field $H_A$ active at the instant $t_1$, the magnetization of the A elements is in practice deflected only ineffectually out of the easy direction; in any case, between the instants $t_1$ and $t_2$ the magnetic stray field components of the A elements are sufficiently large with respect to the easy direction of the neighboring B elements to influence the return of magnetization of the B elements, which takes place during this time, in the sense of the transmission of information which is to be carried out (see arrow A→B).

At the instant $t_2$ the C elements are deflected in the hard direction, while the magnetization of the A and B elements is at least approximately parallel to the easy direction.

At the instant $t_3$ the A and C elements are deflected in the hard direction, while, owing to the relatively small driver field $H_B$, the magnetization of the B elements is in practice deflected only insignificantly out of the easy direction. Between the instants $t_3$ and $t_4$ the magnetic stray field component of the B elements is sufficiently large with respect to the easy direction of the neighboring C elements to influence the return during this time of the magnetization of the C elements in the sense of the information transmission to be carried out (see arrow B→C).

At the instant $t_4$ the A elements are deflected in the hard direction, while the magnetization of the B and C elements is at least approximately parallel to the easy direction.

At the instant $t_5$ the A and B elements are deflected in the hard direction, while the magnetization of the C elements is deflected only insignificantly out of the easy direction by the relatively small magnetic driver field $H_C$ which is effective at this instant. Between the instants $t_5$ and $t_6$ the magnetic stray field component of the C elements is sufficiently large with respect to the easy direction of the neighboring A elements to influence the return at this instant of the magnetization of the A elements in the sense of the information transmission to be carried out (see arrow C→A).

At the instant $t_6$ the B elements are deflected in the hard direction, while the magnetization of the A and C elements is at least approximately parallel to the easy direction.

This concludes one cycle of the periodic process; the instant $t_7$ is again actually analogous to $t_1$, the instant $t_8$ is analogous to $t_2$ etc.

While the invention has been particularly shown and described with reference to preferred embodiments thereof, it will be understood by those skilled in the art that various changes in form and details may be made therein without departing from the spirit and scope of the invention.

What is claimed is:

1. A device comprising, a controlling and a controlled element made of thin magnetic film, each said element defining a portion of a flux path only and each exhibiting a direction of easy magnetization defining opposite stable states of flux remanence, means for applying a drive field to deflect the magnetization of said controlled element away from its easy direction, and means comprising a static stray field from said controlling element for coincidently applying a field parallel to the easy direction of said controlled element and establishing said controlled element in a datum or opposite stable state whereby the state assumed by said controlled element is determined and controlled by the remanence state of said controlling element.

2. The device of claim 1, wherein said controlled element exhibits uniaxial anisotropy.

3. The device of claim 2 wherein each said element comprises magnetic material having a thickness between 100 and 1500 A.

4. The device as set forth in claim 1, wherein said drive field is applied substantially perpendicular to the easy direction of said controlled element.

5. A shift register comprising, a plurality of thin film elements made of magnetic material exhibiting uniaxial anisotropy which defines opposite stable states of flux remanence, each said element defining a portion of a flux path only and positioned sequentially in space with respect to one another, means for sequentially applying drive fields coincidently to pairs of said elements to deflect the magnetization of a pair of said elements away from their respective easy directions, and means comprising the stray flux couplings from the next preceding element of said register for applying a field parallel to the easy direction of one of said pair of elements to establish the one element of said pair in one of its remanence states whereby the state assumed by the one element of said pair is unambiguously controlled by the remanence state of the next preceding element.

6. The register of claim 5, wherein said elements are positioned sequentially in space, one over the other, and arranged in parallel groups of three.

7. The register of claim 5, wherein the field applied coincidently to each two elements is sequentially terminated.

References Cited in the file of this patent

UNITED STATES PATENTS 3,015,807 Pohm et al. -------------- Jan. 2, 1962